Sept. 29, 1936.  J. L. HOPE  2,055,723
MAGNETIC CLUTCH
Filed April 3, 1935
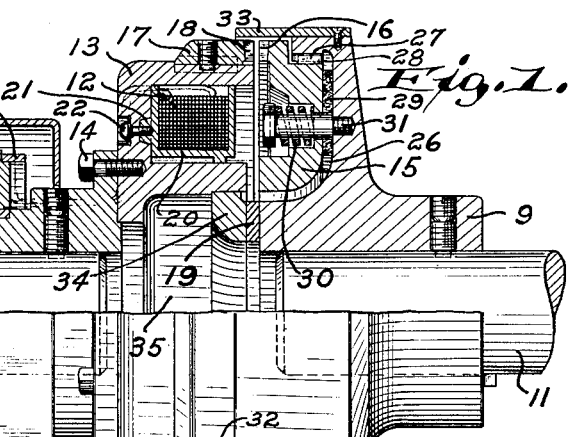
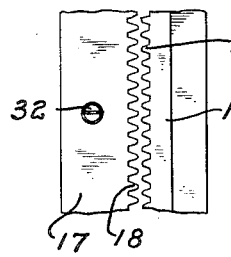
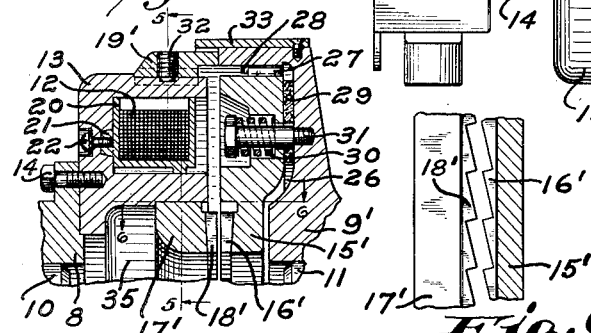
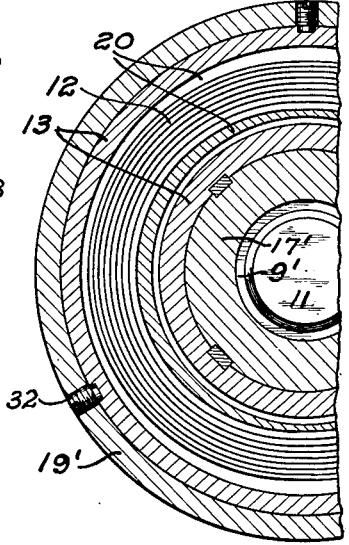
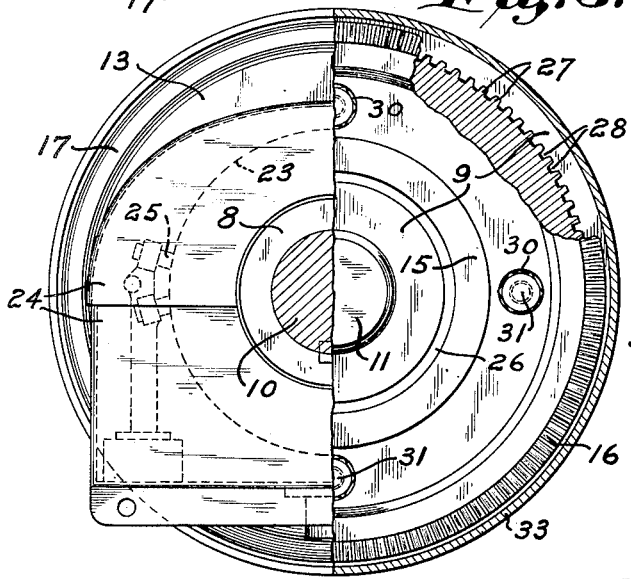
INVENTOR.
J. L. Hope
BY
Morsell, Lieber & Morsell
ATTORNEYS.

Patented Sept. 29, 1936

2,055,723

UNITED STATES PATENT OFFICE 2,055,723

MAGNETIC CLUTCH

James L. Hope, Milwaukee, Wis., assignor to Dings Magnetic Separator Company, Milwaukee, Wis., a corporation of Wisconsin Application April 3, 1935, Serial No. 14,448

14 Claims. (Cl. 192—84)

This invention relates in general to improvements in the art of connecting and disconnecting adjoining rotary members, and relates more specifically to improved magnetic clutch mechanism for drivingly interconnecting substantially alined rotary shafts and for effecting release of the driving connection.

Generally defined, an object of the present invention is to provide improved magnetic clutch mechanism which is durable in construction, and which is moreover highly efficient in operation.

It has heretofore been proposed as shown and described in my prior Patent No. 1,989,984, granted February 5, 1935, to provide a magnetic coupling comprising a pair of rotary coupling members relatively movable along an axis and having inter-engageable teeth which are brought into driving engagement with each other by an electromagnetic coil, and are disengaged by springs acting in opposition to the magnetic force. While this patented coupling has proven highly satisfactory in general commercial use, it has been found under some conditions of operation, that the interlocking teeth which were formed of magnetic material and were to some extent subjected directly to the magnetic influence, would not release as quickly as desired. In clutches operating at high speed there is also a tendency on the part of the electromagnetic coil to shift about the axis of rotation due to inertia; and by virtue of the fact that the driving teeth of these prior clutch mechanisms were located remote from the axis of rotation, the peripheral speed became excessive in high speed drives.

The present invention contemplates the provision of various improvements for obviating these objectionable features of the patented magnetic coupling, in a simple and most effective manner.

One of the more specific objects of the present invention is to provide an improved coupling wherein the toothed interlockable portions of the driving and driven members are located outside of the magnetic field portion having maximum intensity, thereby permitting most effective utilization of the actuating forces.

Another specific object of the invention is to provide a magnetic clutch having interlockable toothed members one of which is formed of non-magnetic material in order to insure quick release of the interlock when the magnet is de-energized.

A further specific object of the invention is to provide an improved coil structure for electromagnetic couplings or the like, and simple means for preventing undesirable displacement of the coil due to inertia.

Still another specific object of the invention is to provide a positive clutch structure wherein the gripping teeth may be located relatively close to the axis of rotation so as to reduce the peripheral speed thereof to a minimum.

An additional specific object of the invention is to provide an improved mounting for the movable member of a releasable shaft coupling so as to facilitate actuation of the mechanism, while retaining maximum strength.

Another specific object of the invention is to provide a simple and compact magnetic clutch assemblage which may be readily constructed and conveniently manipulated.

These and other objects and advantages will be apparent from the following detailed description.

A clear conception of embodiments of the improved features, and of the mode of constructing and operating several types of magnetic clutches built in accordance with the present invention, may be had by referring to the drawing accompanying and forming a part of this specification in which like reference characters designate the same or similar parts in the various views.

Fig. 1 is a part sectional side view of one type of the improved magnetic clutch having one form of interlockable teeth formed on coacting members disposed outwardly beyond the magnet;

Fig. 2 is a part sectional end view of the clutch mechanism of Fig. 1;

Fig. 3 is a fragmentary development of the interlockable members of the clutch of Figs. 1 and 2;

Fig. 4 is a fragmentary central longitudinal section through another type of the improved magnetic clutch;

Fig. 5 is a fragmentary transverse section through the clutch of Figure 4, taken along the line 5—5; and Fig. 6 is a part sectional fragmentary development of the interlockable members of the clutch of Figs. 4 and 5, taken along the line 6—6 of Fig. 4.

While the improved features have been shown and described as being applied to a specific type of magnetic clutch for connecting the adjacent ends of alined rotary shafts, it is not the intent to thereby unnecessarily restrict the scope.

Referring to Figs. 1, 2 and 3 of the drawing, the improved magnetic clutch shown therein, comprises in general a pair of hub elements 8, 9 rigidly but adjustably secured to the adjacent ends of substantially alined rotary shafts 10, 11 respectively; an electromagnetic coil 12 confined within and cooperating with a magnet 13 which is fixedly but removably attached to the hub element 8 by means of cap screws 14; a magnetic toothed member 15 movably supported upon the other hub element 9 and having an annular series of end teeth 16 near the periphery thereof; a non-magnetic toothed member 17 fixedly but removably attached to the periphery of the magnet 13 and having an annular series of end toothed member 15 movably supported upon the teeth 18 adapted to interlock with the teeth 16 of the member 15; and an annular bearing block 19 also carried by the magnet 13 and coacting with a plane end surface of the hub element 9.

The hub elements 8, 9 may be secured to the shafts 10, 11 in any suitable manner, and the coil 12 is preferably of substantially annular but slightly elliptical shape as shown in Fig. 5. This coil 12 is confined within a similarly elliptical groove formed in a casing 20 which is fitted within an annular side recess in the magnet 13, and has local end lugs 21 which are normally held in sockets in the magnet 13 by screws 22. The elliptical formation of the coil 12 positively prevents rotation thereof relative to its confining casing 20, and the lugs 21 likewise positively prevent rotation of the casing 20 relative to the magnet 13, but the coil 12 and its casing 20 may be readily removed from the magnet recess upon release of the screws 22. The electromagnetic coil 12 is connected to contact rings 23 carried by the hub element 8 within a suitable stationary housing 24, in a manner similar to that shown in my prior Patent No. 1,989,984, and brushes 25 coacting with these rings 23 within the housing 24 serve to energize the coil while the clutch mechanism is rotating.

The annular magnetic toothed member 15 is disposed within an end recess 26 in the hub element 9 and is cooperable with the annular poles of the magnet 13, spanning the recess in this magnet within which the coil 12 is disposed. The member 15 besides being provided with the radial teeth 16, has an annular series of peripheral gear teeth 27 which slidably engage an annular series of internal gear teeth 28 formed integral with the element 9. The member 15 normally coacts with and is urged against a buffer plate 29 located within the recess 26, by a series of compression springs 30, when the magnet 13 is de-energized, and is slidable along the teeth 28 away from the plate 29, when the magnet is energized thereby compressing the springs 30. The corresponding ends of the springs 30 remote from the magnet 13, coact directly with the member 15 within sockets thereof, as shown in Fig. 1, and these springs embrace bolts 31 and have their opposite ends in engagement with the bolt heads. The bolts 31 pass through openings in the member 15 and plate 29, and are secured directly to the hub element 9, thereby cooperating with the teeth 27, 28 to provide a driving connection between the element 9 and clutch member 15.

The annular non-magnetic toothed member 17 snugly embraces the magnet 13 and is secured thereto in any suitable manner, as by one or more set screws 32, and the radial teeth 18 of the member 17 are interlockable with the teeth 16 of the member 15 when the latter is drawn toward the magnet 13 by energization of the coil 12. The cooperating teeth 16, 18 are normally concealed and protected by an annular band 33 secured to the periphery of the element 9 and rotatable therewith. The annular bearing block 19 is mounted upon a ring support 34 secured directly to the magnet 13 in any suitable manner, and the interior of the magnet forms a chamber 35 which may be supplied with lubricant for the surface of coaction between the block 19 and the element 9. It is also to be noted, that lubricant which escapes from the bearing block 19, may flow under the influence of centrifugal force, through the space between the member 15 and element 9, thereby lubricating the guiding surfaces between the bolts 31 and member 15 as well as the teeth 27, 28.

Referring to Figs. 4, 5, and 6 of the drawing, it will be noted that the embodiment of the invention shown therein is similar to that just described, except for the location of the toothed interlockable clutch members and the formation of the teeth thereof. In the modification, the movable member 15' which is slidably supported by and rotatable with the hub element 9', has an annular series of radial end teeth 16' disposed near the axis of the shafts 10, 11; and these teeth 16' are interlockable with similarly shaped but reversed teeth 18' formed integral with the annular member 17' which is secured to the interior of the magnet 13 by means of keys. By virtue of this disposition of the teeth 16', 18' near the axis of rotation of the clutch, the annular bearing block 19' is located remote from the axis and is secured to the periphery of the magnet 13 by set screws 32. This bearing block 19' coacts with an end surface of the hub element 9' located near the clutch periphery just within the protecting band 33, and the thrust bearing and teeth 27, 28 are again lubricated by centrifugal force from the chamber 35. The interlockable teeth 16', 18' of this modification are shown as being of slightly different form than the teeth 16, 18 of Fig. 3, but may be of the same form if so desired.

While the normal operation of the improved clutch mechanisms should be apparent from the foregoing description of the details of construction, it will be noted, that when the coil 12 is energized, the magnet 13 quickly becomes effective to compress the springs 30 and to draw the toothed member 15 toward the complementary toothed member 17, thereby causing the teeth 16, 18 to interlock and to produce a positive driving connection between the shafts 10, 11. When the magnetic coil 12 is de-energized, the springs 30 immediately become effective to disengage the teeth 16, 18, and such disengagement is extremely rapid by virtue of the fact that one of the toothed members is formed of non-magnetic material. The intermeshing teeth 27, 28 permit free sliding of the member 15 relative to its carrying element 9 while providing a positive driving connection, and the thrust bearing block 19 prevents the elements 8, 9 from approaching each other axially when the electromagnetic force is applied. The normal operation of both types of clutches specifically illustrated, is obviously the same, and the structural differences do not affect the operation.

By forming the coil 12 elliptical as shown in Fig. 5, and causing the same to coact with an elliptical housing 20, shifting of this coil due to inertia is positively prevented, even when the clutch mechanism is operated at high speed.

While the clutch teeth 16, 18 may be formed as shown in Fig. 3, thereby providing relatively small increments or distances between the successive teeth which will permit almost immediate interlocking of these teeth, the form of teeth 16', 18' illustrated in Fig. 6, may be advantageous under certain conditions of operation. With the interlockable teeth located near the axis of rotation of the clutch, the peripheral speed thereof is also materially reduced, and such location may be desirable where high speed operation of the clutch prevails. The various bearing surfaces of the clutch may be readily lubricated from the chamber 35, with the aid of centrifugal force and all portions of the clutch mechanism are conveniently accessible for inspection and replacement. The coil 12 and its housing 20 may be freely withdrawn from the recess in the magnet 13, by merely releasing the screws 22, and the entire magnet may be removed from its mounting element 8 by merely withdrawing the cap screws 14. The toothed member 15 may be removed from the hub element 9 upon withdrawal of the screws 31, and the member 17 or bearing ring 19' may be removed from the magnet 13 upon release of the said screws 32.

From the foregoing description it will be apparent that the present invention provides a magnetic clutch structure which is simple and compact in construction and which is moreover highly effective in use. The improved assemblage may be conveniently applied to driving and driven shafts which are substantially alined, and is effectively protected against damage during actual operation. The invention has proven highly successful in commercial operation, and has been found to materially improve the efficiency of the type of clutch shown in my prior patent, especially under certain conditions of use.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:—

1. In combination, a pair of coupling members rotatable about a common axis and relatively movable therealong, an electro-magnet constantly rotatable with one of said members and operable to relatively move said members along said axis, said members having inter-engageable teeth and the teeth of one of said members being formed entirely of non-magnetic material, and resilient means for disengaging said teeth when said electro-magnet is de-energized.

2. In combination, a pair of coupling members rotatable about a common axis, one of said members being movable along said axis and the other being fixed against such movement, an electro-magnet constantly rotatable with said fixed member and operable to move said other member along said axis, said members having inter-engageable teeth and the teeth of one of said members being formed entirely of non-magnetic material, and resilient means for disengaging said teeth when said electro-magnet is de-energized.

3. In combination, a pair of relatively movable coupling members rotatable about a common axis, an annular electro-magnet constantly rotatable with one of said members and operable to produce an annular magnetic field for relatively moving said members along said axis, said members having annular series of inter-engageable teeth disposed outside of said field and the teeth of one of said members being formed of non-magnetic material, and resilient means for disengaging said teeth when said electro-magnet is de-energized.

4. In combination, a pair of relatively movable coupling members rotatable about a common axis and having inter-engageable end teeth radiating from said axis, an annular magnet for relatively moving said members to inter-connect said teeth and having an annular recess, a coil for energizing said magnet confined within said recess, said coil extending around said axis and having an elliptical support confined within said recess, and means for disengaging said teeth when said coil is de-energized.

5. In combination, a pair of relatively movable coupling members rotatable about a common axis and having interlockable parts, an annular magnet for relatively moving said members to inter-connect said parts, a coil for energizing said magnet, said coil surrounding said axis and having an elliptical support for preventing rotation thereof relative to said magnet, and means for disengaging said parts when said coil is de-energized.

6. In combination, a pair of relatively movable coupling members, an annular magnet for relatively moving said members and having an annular recess in the side thereof, a coil support disposed within said recess and having end lugs fitting local pockets in said magnet, a coil for energizing said magnet, said coil surrounding said axis and coacting with an elliptical surface of said support, and means for moving said members in opposition to said magnet.

7. In combination, a pair of hub elements rotatable about an axis, a magnet carried by one of said hub elements and having a thrust bearing engaging an end surface of the other elements, a toothed member movably supported by said other element and movable along said axis by said magnet, a toothed member carried by said magnet and cooperable with said movable toothed member to produce a positive driving connection between said members, and means for moving said movable member away from said magnet.

8. In combination, a pair of hub elements rotatable about an axis, an annular magnet carried by one of said elements and surrounding said axis, a thrust bearing interposed between said magnet and said other element, a movable member carried by said other element and cooperable with said magnet, another member fixedly secured to said magnet, said movable and fixed members having interengageable teeth disposed beyond the zone of action of said magnet, and means for moving said movable member away from said magnet.

9. In combination, a pair of hub elements rotatable about an axis, an annular magnet carried by one of said elements and having a recess facing the other of said elements, a coil disposed within said recess and operable to energize said magnet, a movable member carried by said other element, and cooperable with said magnet, another member fixedly secured to said magnet, said movable and fixed members having inter-engageable teeth adaptable to be brought into interlocking position by said magnet and said teeth being disposed beyond the zone of action of said magnet, and resilient means for urging said movable member away from said magnet.

10. In combination, a pair of hub elements rotatable about a common axis, a coupling member carried by each of said hub elements, one of said members being movable along said axis and the other being fixed against such movement, an electro-magnet constantly rotatable with said fixed member and operable to move said other member along said axis within its carrying element, said members having interengageable teeth, and said movable member having additional teeth slidable along complementary teeth of its carrying element, and resilient means for disengaging said member teeth when said electro-magnet is de-energized.

11. In combination, a pair of hub elements rotatable about a common axis, interlockable members carried by said hub elements, one of said members being formed with teeth which are slidable along complementary teeth on its carrying element and the other of said members being fixed against movement relative to its carrying element, an electro-magnet constantly rotatable with said fixed member and operable to move said other member along said axis, and resilient means for urging said movable member away from said fixed member.

12. In combination, a pair of coupling members rotatable about a common axis and relatively movable therealong, an electro-magnet operable to relatively move said members along said axis, said members having interengageable teeth and the teeth of one of said members being formed entirely of non-magnetic material, and means for disengaging said teeth when said electro-magnet is de-energized.

13. In combination, a pair of coupling members rotatable about a common axis, one of said members being movable along said axis and the other being fixed against such movement, an electro-magnet operable to move said other member along said axis, said members having interengageable teeth and the teeth of one of said members being formed entirely of non-magnetic material, and means for disengaging said teeth when said electro-magnet is de-energized.

14. In combination, a pair of relatively movable coupling members rotatable about a common axis, an annular electro-magnet operable to produce an annular magnetic field for relatively moving said members along said axis, said members having annular series of inter-engageable teeth disposed outside of said field and the teeth of one of said members being formed of non-magnetic material, and means for disengaging said teeth when said electro-magnet is de-energized.

JAMES L. HOPE.